(12) United States Patent
Choi et al.

(10) Patent No.: US 12,202,348 B2
(45) Date of Patent: Jan. 21, 2025

(54) 360-DEGREE ROTATABLE WHEEL APPARATUS AND MULTI WHEEL DRIVE MOBILITY USING THE SAME

(71) Applicants: Hyundai Motor Company, Seoul (KR); Kia Corporation, Seoul (KR)

(72) Inventors: Jung Hun Choi, Hwaseong-Si (KR); Dong Hyun Ha, Seoul (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 685 days.

(21) Appl. No.: 17/507,544

(22) Filed: Oct. 21, 2021

(65) Prior Publication Data

US 2022/0379660 A1 Dec. 1, 2022

(30) Foreign Application Priority Data

May 26, 2021 (KR) ........................ 10-2021-0067860

(51) Int. Cl.
| | | |
|---|---|---|
| *B60K 7/00* | (2006.01) | |
| *B60G 3/01* | (2006.01) | |
| *B60G 11/14* | (2006.01) | |
| *B60K 17/34* | (2006.01) | |
| *B62D 5/04* | (2006.01) | |

(52) U.S. Cl.
CPC ................. *B60K 7/00* (2013.01); *B60G 3/01* (2013.01); *B60G 11/14* (2013.01); *B60K 7/0007* (2013.01); *B60K 17/358* (2013.01); *B62D 5/0418* (2013.01); *B60K 2007/0038* (2013.01)

(58) Field of Classification Search
CPC .............. B60K 7/00; B60K 2007/0038; B60K 2007/0092
See application file for complete search history.

(56) References Cited

U.S. PATENT DOCUMENTS

| | | | |
|---|---|---|---|
| 7,464,785 B2* | 12/2008 | Spark ..................... | B60T 8/246 |
| | | | 180/242 |
| 11,130,519 B1* | 9/2021 | Cui ...................... | B66F 9/07568 |
| 11,904,934 B2* | 2/2024 | Schwaiger ............. | B66F 9/063 |

(Continued)

FOREIGN PATENT DOCUMENTS

| | | | | |
|---|---|---|---|---|
| DE | 202007004677 U1 * | 7/2007 | ............. | B60B 19/00 |
| DE | 202008004190 U1 * | 7/2008 | ........... | B60K 17/043 |

(Continued)

*Primary Examiner* — Kevin Hurley
(74) *Attorney, Agent, or Firm* — Morgan, Lewis & Bockius LLP

(57) ABSTRACT

A 360-degree rotating wheel apparatus may include a cap unit defining a driving space at a lower side of the cap unit; an in-wheel driving unit provided in the driving space in the cap unit and configured to generate a driving force during operation thereof; and an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis, increasing the traveling range of the wheel apparatus, and which is easily applicable to a mobility to be improved in usability thereof.

8 Claims, 10 Drawing Sheets

(56) References Cited

U.S. PATENT DOCUMENTS

2022/0306193 A1* 9/2022 Blom ...................... B66F 7/243
2023/0202287 A1* 6/2023 Park ..................... B62D 5/0418
                                                          180/13

FOREIGN PATENT DOCUMENTS

| EP | 0595302 A1 * | 5/1994 | |
|----|--------------|--------|---|
| KR | 10-2020-0135082 | 12/2020 | |
| WO | WO-2016142553 A1 * | 9/2016 | ........... B60B 19/003 |
| WO | WO-2018130961 A1 * | 7/2018 | ............... B62D 5/04 |
| WO | WO-2024072095 A1 * | 4/2024 | |

* cited by examiner

360-DEGREE ROTATABLE WHEEL APPARATUS AND MULTI WHEEL DRIVE MOBILITY USING THE SAME

CROSS-REFERENCE TO RELATED APPLICATION

The present application claims priority to Korean Patent Application No. 10-2021-0067860, filed on May 26, 2021, the entire contents of which is incorporated herein for all purposes by this reference.

BACKGROUND OF THE INVENTION

Field of the Invention

The present invention relates to a 360-degree rotating wheel apparatus in which a wheel rotates 360 degrees to increase a traveling range of the rotating wheel apparatus, and a multi-wheel drive mobility using the same.

Description of Related Art

Recently, driving of wheels has been required for the movement of a mobility. However, conventional wheels are only allowed to rotate left or right, and the turning radius thereof is fixed.

Recently, to improve the usability of a mobility, research has been conducted to increase the moving radius of the same.

As a result, a ball tire system, in particular, a ball tire system using a magnetic levitation system, has been developed.

However, since there is a limit to lifting a mobility only using a magnetic force acquired via a magnetic levitation system, the ball tire system is limitedly applied only to a small mobility.

That is, when a 360-degree rotatable wheel configured using a magnetic levitation system is applied to a heavy mobility, such as a vehicle, the strength of magnetic force required for such use is very large. Thus, it is difficult to apply such a wheel to a heavy mobility.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a 360-degree rotating wheel apparatus in which a wheel is rotated by 360 degrees to increase a traveling range of the wheel apparatus, and which is easily applicable to a mobility to be improved in usability. Various aspects of the present invention are directed to providing a multi-wheel mobility using the 360-degree rotating wheel apparatus.

In view of the foregoing, a 360-degree rotating wheel apparatus according to various exemplary embodiments of the present invention includes: a cap unit defining a driving space at a lower side of the cap unit; an in-wheel driving unit provided in the driving space in the cap unit and configured to generate a driving force during operation thereof; and an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis of the 360-degree rotating wheel apparatus.

The 360-degree rotating wheel apparatus further includes a housing having an accommodation space formed therein to accommodate the cap unit, and the housing and the cap unit are connected to each other via at least a suspension.

The suspension includes: a first suspension provided at the center portion of the cap unit and connected to the housing, wherein the first suspension is configured to damp vibration caused according to a vertical movement of the 360-degree rotating wheel apparatus; and a second suspension spaced from the first suspension and connected to the cap unit and the housing, wherein the second suspension is configured to damp vibration caused according to a longitudinal movement and a lateral movement of the 360-degree rotating wheel apparatus.

A mounting portion is provided on a vehicle body for electrical connection and fixing, and the 360-degree rotating wheel apparatus further includes a fastening portion which is provided on an external surface of the housing to be fastened to the mounting portion in the vehicle body so that when the fastening portion is fastened to the mounting portion, the housing is fixed and electrically connected to the vehicle body.

A bump rubber is coupled to the external surface of the cap unit to cancel vibration transmitted through the in-wheel driving unit.

The angle adjustment unit includes: a ring unit provided in the driving space in the cap unit and extending in a shape of a ring along the circumference of the cap unit, wherein a driveshaft extending from the in-wheel driving unit is connected to the ring unit; and a power transmission unit provided in the cap unit and connected to the ring unit to rotate the ring unit depending on whether the power transmission unit operates.

The ring unit is formed in an annular shape and has a connecting gear provided in an extension direction thereof, and the power transmission unit includes a rotational driving unit provided in the cap unit and configured to generate a rotational force and a gear unit connected to the rotational driving unit to be rotated by receiving the rotational force, wherein the gear unit is engaged with the connecting gears of the ring unit.

A guide unit, on which the ring unit is accommodated, is provided on an internal surface of the cap unit.

An inverter and power module controller in which a power module configured to control driving and regenerative braking of the in-wheel driving unit is embedded is provided in the cap unit.

Meanwhile, a multi-wheel drive mobility according to various exemplary embodiments of the present invention includes: at least a heel apparatus, each of which includes: a cap unit defining a driving space at a lower side of the cap unit; an in-wheel driving unit provided in the driving space in the cap unit and configured to generate a driving force during operation thereof; and an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis; and a controller configured to control the in-wheel driving unit and the angle adjustment unit of each of the at least a rotating wheel apparatus according to a requested traveling speed and a requested traveling direction thereof.

When the requested traveling direction corresponds to straight forward traveling, the controller is configured to control each angle adjustment unit to be disposed such that the in-wheel driving units of the at least a rotating wheel apparatus corresponding to front and rear wheels of the multi-wheel drive mobility are directed forward thereof.

When the requested traveling direction corresponds to turning traveling, the controller is configured to control each angle adjustment unit to be disposed such that the in-wheel driving units of the at least a rotating wheel apparatus corresponding to front wheels of the multi-wheel drive mobility are directed towards a turning direction and the in-wheel driving units of the at least a rotating wheel apparatus corresponding to the rear wheels of the multi-wheel drive mobility are directed towards a direction opposite to the turning direction.

When the requested traveling direction corresponds to lateral traveling of the multi-wheel drive mobility, the controller is configured to control each angle adjustment unit to be disposed such that the in-wheel driving units of the at least a rotating wheel apparatus corresponding to front and rear wheels of the multi-wheel drive mobility are directed towards a lateral side of the multi-wheel drive mobility, and controls the in-wheel driving units corresponding to the front and rear wheels to be driven in the same direction thereof.

When the requested traveling direction corresponds to in-situ rotation, the controller is configured to control each angle adjustment unit so that the front left and rear right rotating wheel apparatuses are rotated in a predetermined direction and the front right and rear left rotating wheel apparatuses are rotated in a direction opposite to the predetermined direction so that each rotating wheel apparatus is disposed diagonally, and such that the left in-wheel driving units are driven in a forward direction and the right in-wheel driving units are driven in a reverse direction thereof.

In a 360-degree rotating wheel apparatus configured as described above and a multi-wheel drive mobility using the same, wheels are rotated 360 degrees, increasing the traveling range of the wheel apparatus and the mobility. Furthermore, the wheel apparatus is easily applicable to a mobility to be improved in the usability thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
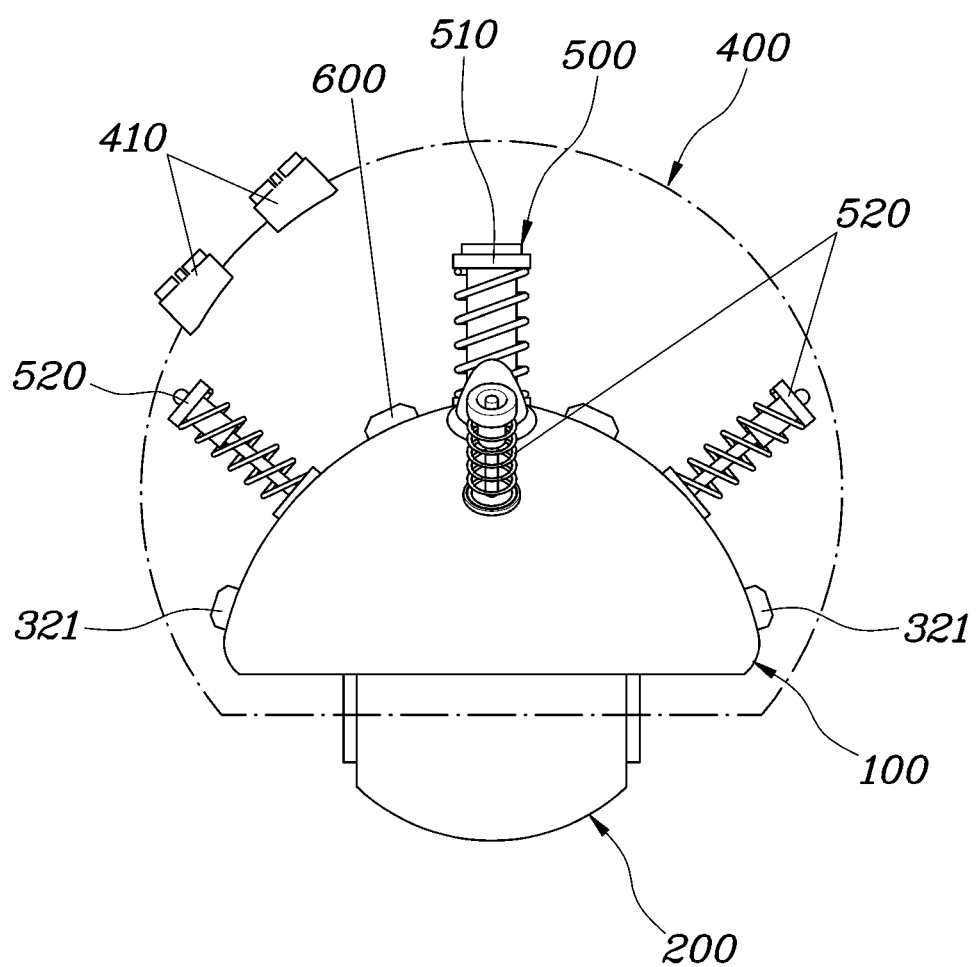
FIG. 1 is a view exemplarily illustrating a 360-degree rotating wheel apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a 360-degree rotating wheel apparatus according to various exemplary embodiments of the present invention and a multi-wheel drive mobility using the same will be described with reference to the accompanying drawings.

Figure 2:
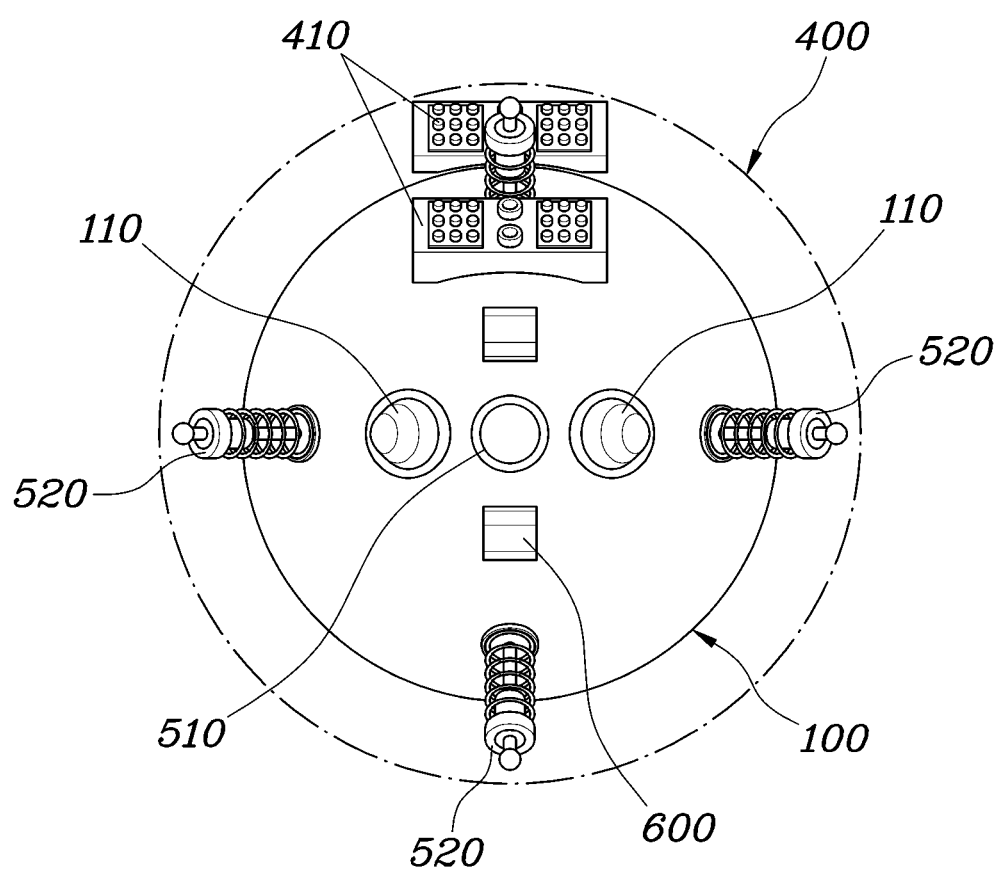
FIG. 2 is a top plan view of the 360-degree rotating wheel apparatus illustrated in FIG. 1.
Figure 3:
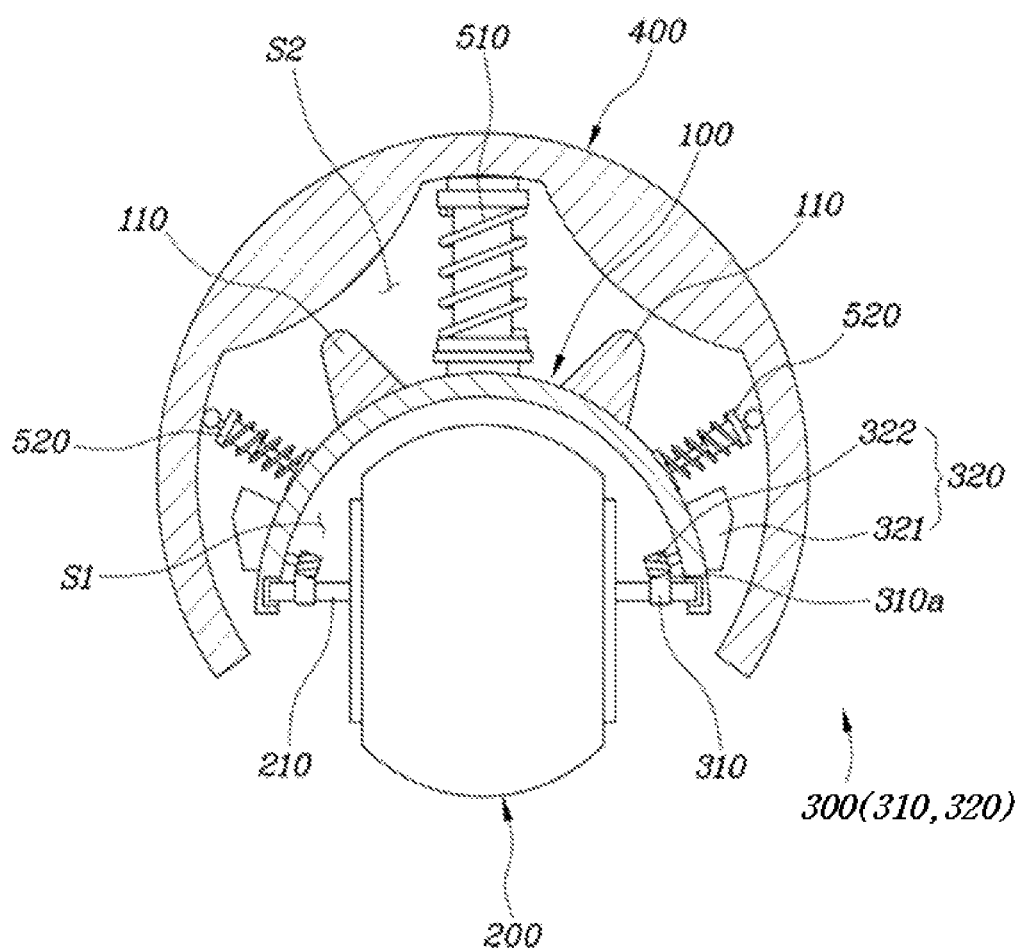
FIG. 3 is a cross-sectional view of the 360-degree rotating wheel apparatus illustrated in FIG. 1.
Figure 4:
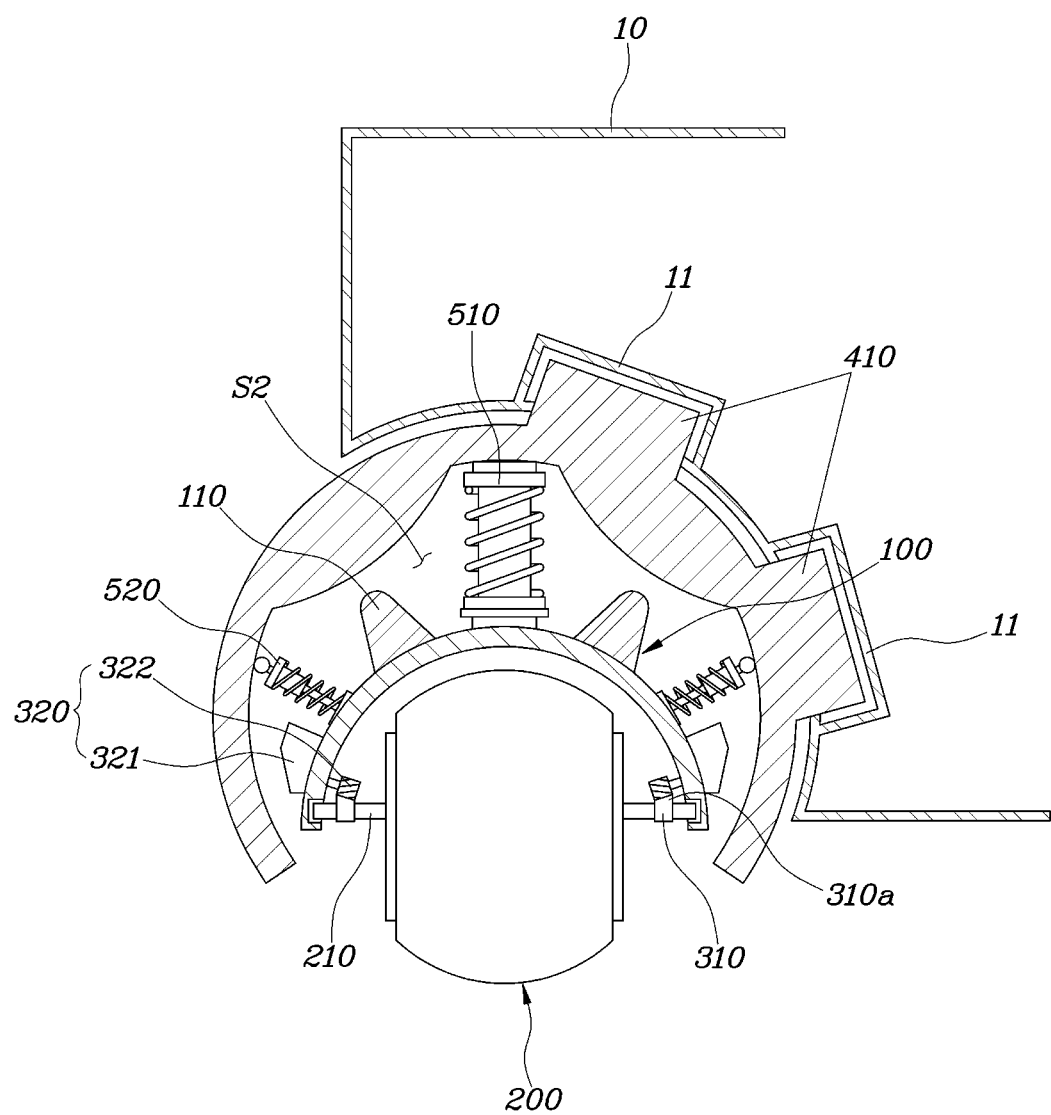
FIG. 4 is a view of the 360-degree rotating wheel apparatus illustrated in FIG. 1 in the state of being mounted to a mobility.
Figure 5:
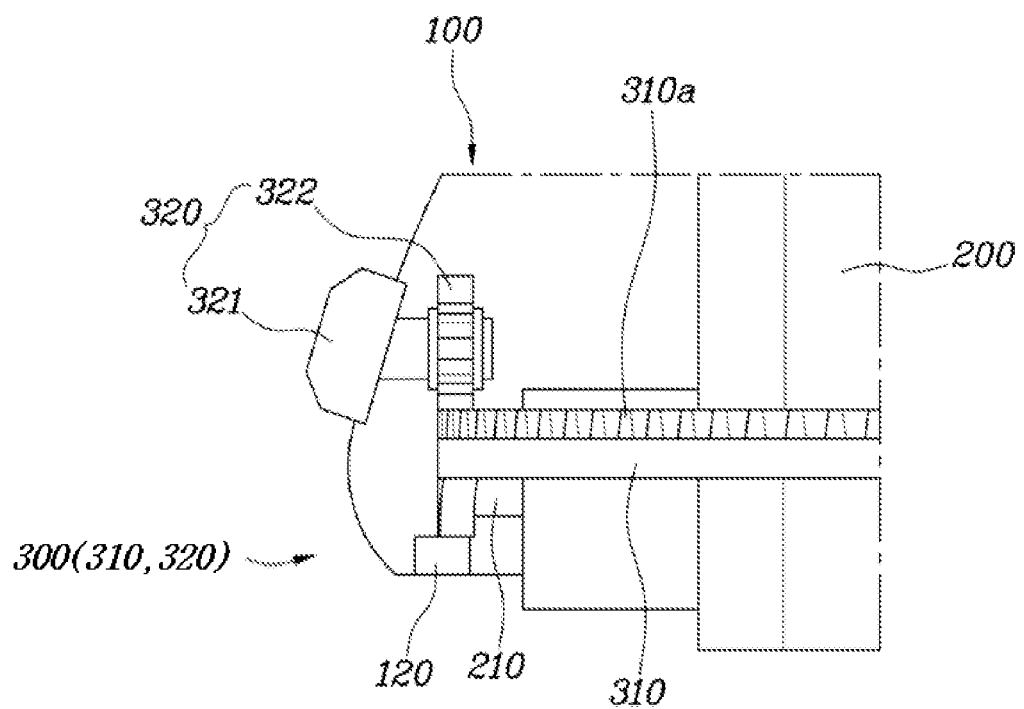
FIG. 5 is a view exemplarily illustrating an in-wheel drive unit and an angle adjustment unit according to various exemplary embodiments of the present invention.
Figure 6:
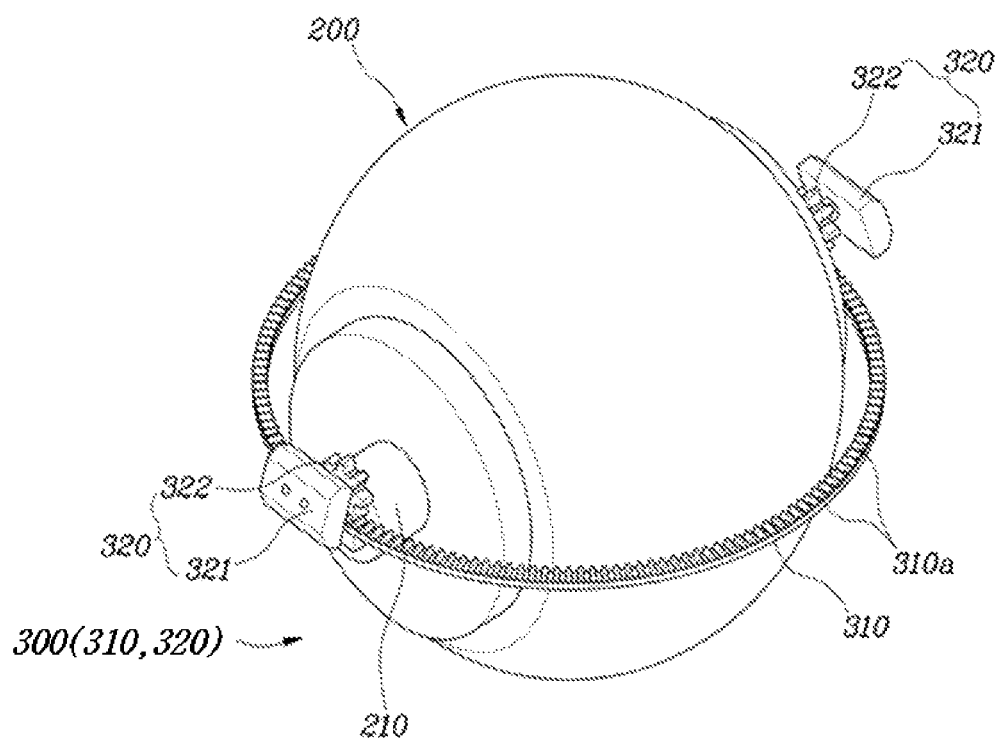
FIG. 6 is a view for describing the angle adjustment unit of the present invention.
Figure 7:
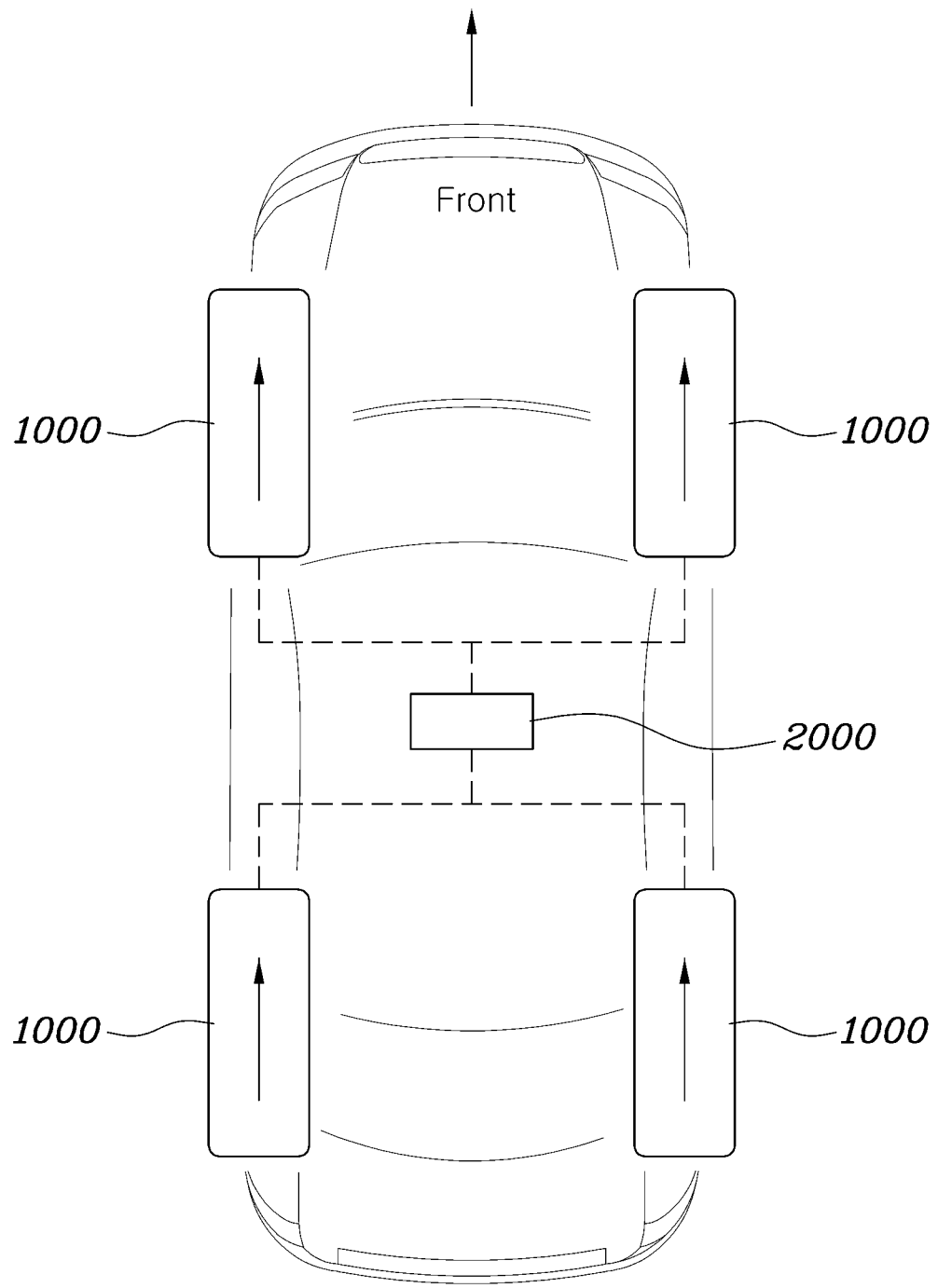
FIG. 7 is a view for describing linear traveling of a multi-wheel drive mobility according to various exemplary embodiments of the present invention.
Figure 8:
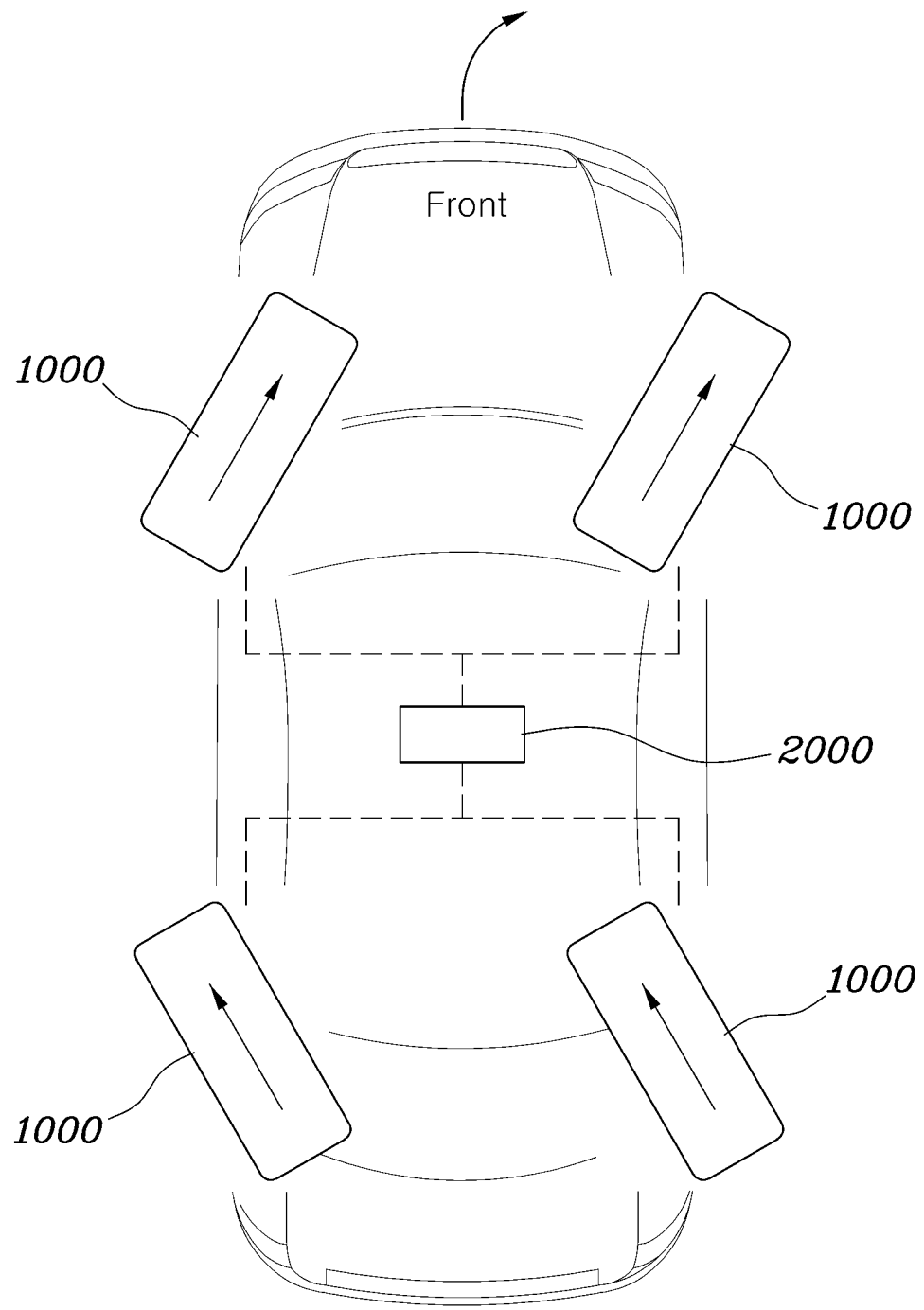
FIG. 8 is a view for describing turning traveling of a multi-wheel drive mobility according to various exemplary embodiments of the present invention.
Figure 9:
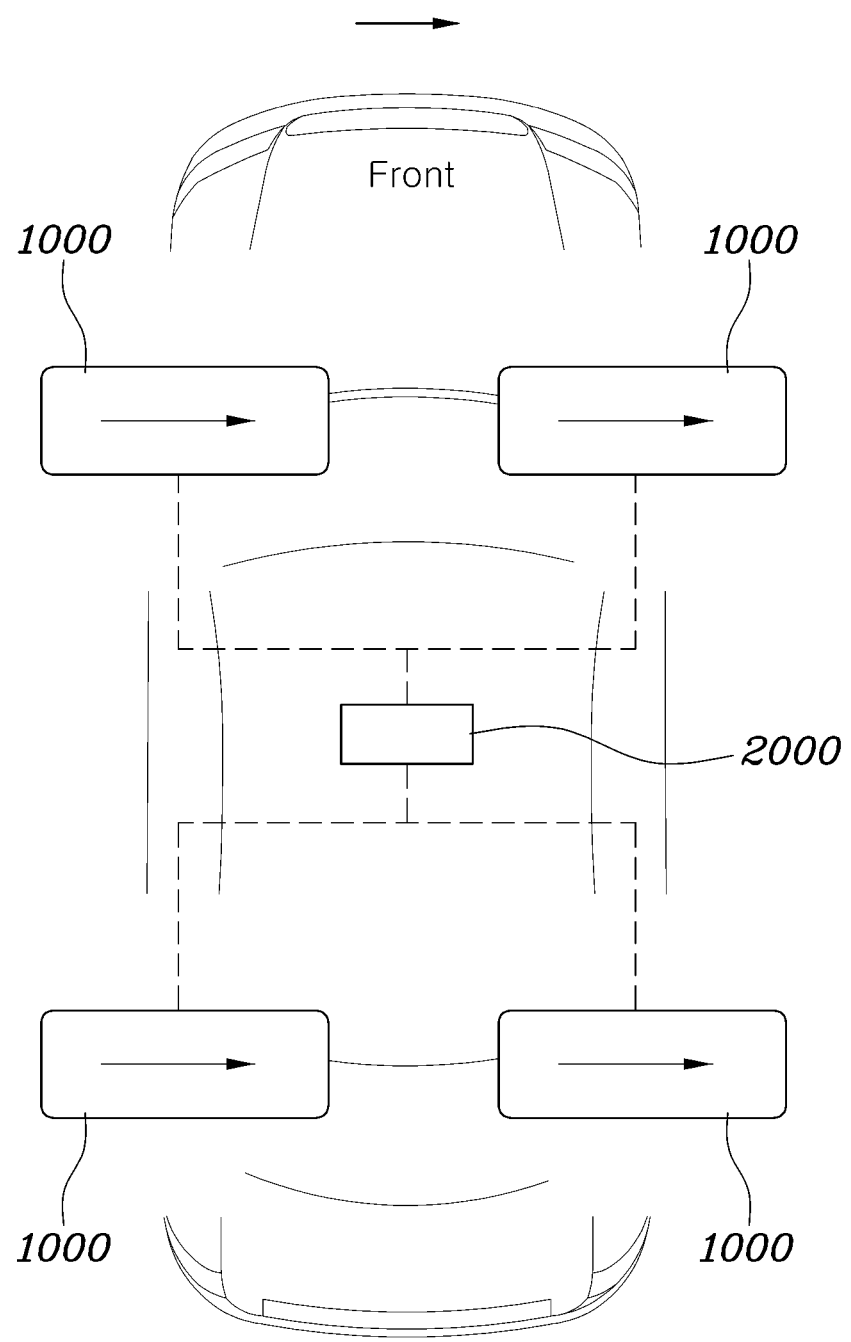
FIG. 9 is a view for describing lateral traveling of a multi-wheel drive mobility according to various exemplary embodiments of the present invention.
Figure 10:
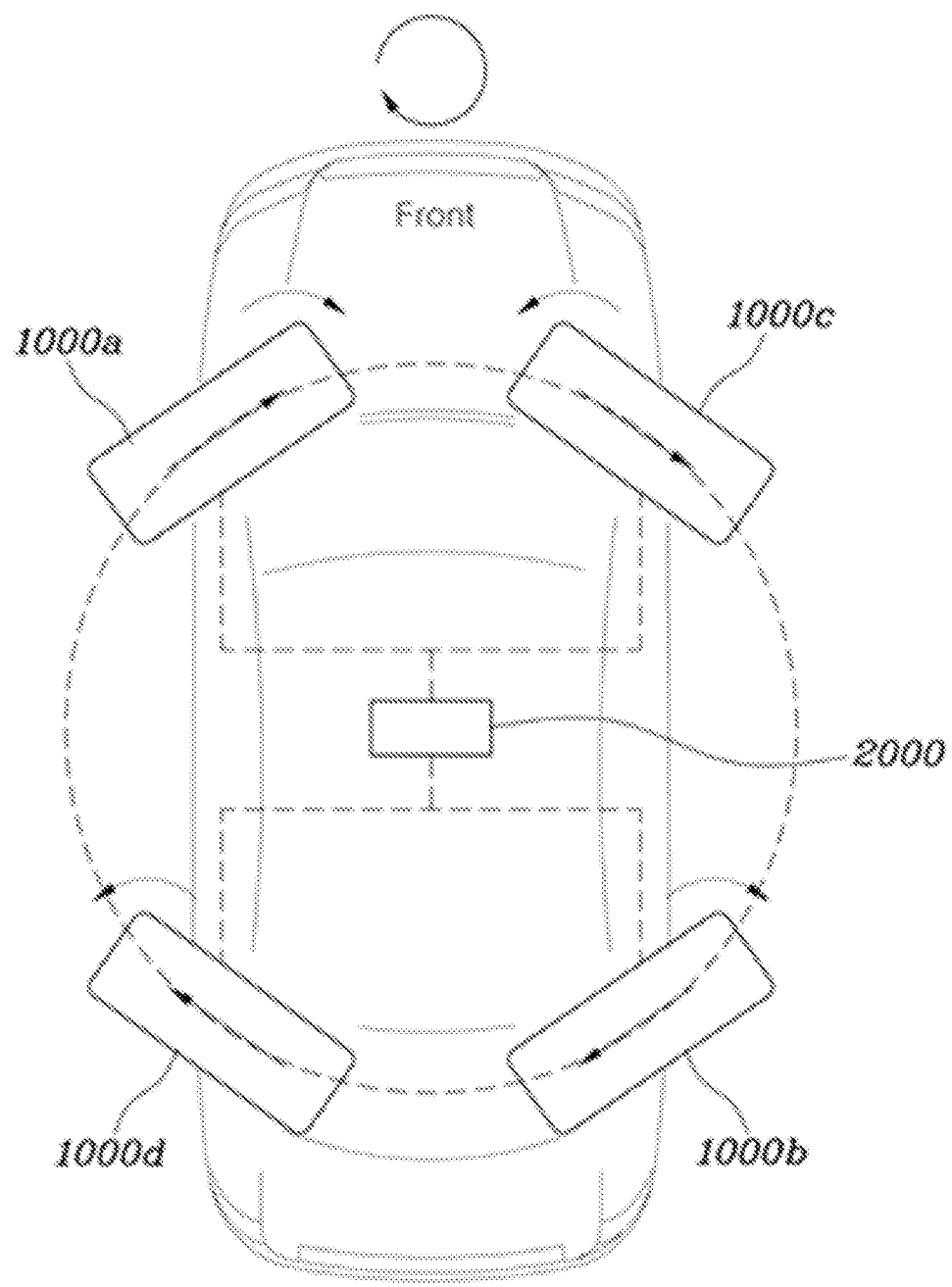
FIG. 10 is a view for describing in-situ rotation of a multi-wheel drive mobility according to various exemplary embodiments of the present invention.

FIG. 1 is a view exemplarily illustrating a 360-degree rotating wheel apparatus according to various exemplary embodiments of the present invention, FIG. 2 is a top plan view of the 360-degree rotating wheel apparatus illustrated in FIG. 1, FIG. 3 is a cross-sectional view of the 360-degree rotating wheel apparatus illustrated in FIG. 1, and FIG. 4 is a view of the 360-degree rotating wheel apparatus illustrated in FIG. 1 in the state of being mounted to a mobility. FIG. 5 is a view exemplarily illustrating an in-wheel drive unit and an angle adjustment unit according to various exemplary embodiments of the present invention, FIG. 6 is a view for describing the angle adjustment unit of the present invention. FIG. 7 is a view for describing linear traveling of a multi-wheel drive mobility according to various exemplary embodiments of the present invention, FIG. 8 is a view for describing turning traveling of the multi-wheel drive mobility according to various exemplary embodiments of the present invention, FIG. 9 is a view for describing lateral traveling of the multi-wheel drive mobility according to various exemplary embodiments of the present invention, and FIG. 10 is a view for describing in-situ rotation of the multi-wheel drive mobility according to various exemplary embodiments of the present invention.

As illustrated in FIG. 1, FIG. 2, and FIG. 3, a 360-degree rotating wheel apparatus according to various exemplary embodiments of the present invention includes: a cap unit 100 defining a driving space S1 at the lower side thereof; an in-wheel driving unit 200 provided in the driving space S1 in the cap unit 100 and configured to generate a driving force during operation thereof; and an angle adjustment unit 300 connecting the in-wheel driving unit 200 and the cap unit 100 to each other and configured to cause the in-wheel driving unit 200 to rotate in a circumferential direction of the cap unit 100 so that a traveling direction determined according to operation of the in-wheel driving unit 200 is changed by 360 degrees around a vertical axis of the 360-degree rotating wheel apparatus.

The cap unit 100 has a semicircular shape to define the driving space S1 at the lower side thereof, and the in-wheel driving unit 200 is provided in the driving space S1.

The in-wheel driving unit 200 generates a driving force during operation, and may include a motor unit that generates power and a wheel unit which is rotated using the power from the motor unit. The in-wheel driving unit 200 is variously known as an in-wheel motor generally, and a detailed description thereof will be omitted.

Meanwhile, the angle adjustment unit 300 is provided on the internal surface of the cap unit 100, and the in-wheel driving unit 200 is connected to the cap unit 100 via the angle adjustment unit 300. The angle adjustment unit 300 rotates the in-wheel driving unit 200 in the circumferential direction of the cap unit 100 so that the traveling direction determined according to the operation of the in-wheel driving unit 200 is changed by 360 degrees. That is, when the in-wheel driving unit 200 is rotated by 360 degrees about the vertical axis in the driving space S1 of the cap unit 100 by the angle adjustment unit 300, the direction of the driving force generated by the operation of the in-wheel driving unit 200 is changed by 360 degrees. As a result, when the 360-degree rotating wheel apparatus according to various exemplary embodiments of the present invention is applied to a mobility, the movement range of the mobility is increased.

Meanwhile, as may be seen from FIG. 3, the 360-degree rotating wheel apparatus further includes a housing 400 having an accommodation space S2 defined therein to accommodate the cap unit 100, and the housing 400 and the cap unit 100 are interconnected via a suspension 500.

The housing 400, which has the accommodation space S2, may have a spherical shape with an open lower side thereof. Furthermore, since the cap unit 100 is connected to the housing 400 via the suspension 500, vibration transmitted via the in-wheel driving unit 200 is damped by the suspension 500.

Here, the suspension includes: a main suspension 510 provided on a central side of the cap unit 100 and connected to the housing 400, wherein the main suspension 510 is configured to damp vibration caused according to a vertical movement of the 360-degree rotating wheel apparatus; and an auxiliary suspension 520 spaced from the main suspension 510 and connected to the cap unit 100 and the housing 400, wherein the auxiliary suspension 520 is configured to damp vibration caused according to longitudinal and lateral movements.

In the present way, the cap unit 100 is connected to the housing 400 via the main suspension 510 and the auxiliary suspension 520, and the vibration transmitted via the in-wheel driving unit 200 provided in the cap unit 100 is damped.

One side of the main suspension 510 is provided in the center portion of the external surface of the cap unit 100, and the other side of the main suspension 510 is provided in the center portion of the internal surface of the housing 400, so that the vibration caused according to the vertical movement is damped.

One side of the auxiliary suspension 520 is provided on the external surface of the cap unit 100 to be spaced from the main suspension 510, and the other side of the auxiliary suspension 520 is provided on the internal surface of the housing 400 to be spaced from the main suspension 510, whereby the auxiliary suspension 520 is disposed diagonally.

Furthermore, a plurality of auxiliary suspensions 520 may be provided. Accordingly, with reference to the main suspension 510, when an auxiliary suspension 520 is disposed in front of or behind the main suspension 510, the auxiliary suspension 520 damps the vibration caused according to the longitudinal movement. Furthermore, with reference to the main suspension 510, when an auxiliary suspension 520 is disposed at the left or right side of the main suspension 510, the auxiliary suspension 520 damps the vibration caused according to the lateral movement.

The installation positions and number of auxiliary suspensions 520 may be determined depending on vibration characteristics transmitted via the in-wheel driving unit 200.

Meanwhile, a bump rubber 110 may be coupled to the external surface of the cap unit 100 to cancel the vibration transmitted through the in-wheel driving unit 200. For the present reason, when the vibration transmitted via the in-wheel driving unit 200 is transmitted to the cap unit 100, the bump rubber 110 damps and buffers the vibration.

Specifications according to the number and size of bump rubbers 110 may be determined depending on vibration characteristics transmitted to the cap unit 100.

Meanwhile, as illustrated in FIG. 4, a mounting portion 11 is provided on a vehicle body 10 for electrical connection and fixing, and a fastening portion 410 is provided on the external surface of the housing 400 to be fastened to the mounting portion 11 in the vehicle body 10. Thus, when the fastening portion 410 is fastened to the mounting portion 11, the housing 400 is fixed and electrically connected to the vehicle body 10.

That is, the vehicle body 10 is configured such that the housing 400 is mounted thereon, and the mounting portion 11 is provided in a mounting area of the housing 400. Accordingly, when the fastening portion 410 provided on the housing 400 is connected to the mounting portion 11 of the vehicle body 10 during mounting of the housing 400 on the vehicle body 10, the fastening portion 410 and the mounting portion 11 are fixedly fastened to each other. In the instant case, the mounting portion 11 and the fastening portion 410 may be bolted to each other.

Furthermore, since the mounting portion 11 and the fastening portion 410 are each made to be electrically connected, when the fastening portion 410 of the housing 400 is mounted to the mounting portion 11 of the vehicle body 10, various command signals transmitted from a controller provided in the vehicle body 10 may be transmitted to electric devices in the housing 400.

For the present reason, since it is easy to assemble and replace the housing 400 including the cap unit 100, the in-wheel driving unit 200, and the angle adjustment unit 300 to the vehicle body 10, the housing 400 may be replaced according to the requirements of the mobility. Furthermore, it is possible to freely replace the housing 400 with respect to another vehicle through mounting and dismounting.

Meanwhile, as illustrated in FIG. 5 and FIG. 6, the angle adjustment unit 300 includes: a ring unit 310 provided in the driving space S1 of the cap unit 100 and extending in a circular shape along the circumference of the cap unit 100, wherein a driveshaft 210 extending from the in-wheel driving unit 200 is rotatably connected to the ring unit 310; and a power transmission unit 320 provided in the cap unit 100 and connected to the ring unit 310 to rotate the ring unit 310 depending on whether the power transmission unit 320 operates.

That is, the driveshaft 210 extends from a rotation center portion axis of the in-wheel driving unit 200 in the horizontal direction thereof. The driveshaft 210 may extend from the case of the in-wheel driving unit 200 or the center portion of the motor. Through this, as for the in-wheel driving unit 200, the driveshaft 210 is connected to the ring unit 310, and the ring unit 310 is rotated by the power transmission unit 320 provided in the cap unit 100, whereby the in-wheel driving unit 200 may be rotated by 360 degrees around the vertical axis.

The ring unit 310 is formed in an annular shape and has a connecting gear 310a formed in the extension direction thereof, and the power transmission unit 320 includes a rotational driving unit 321 provided in the cap unit 100 and configured to generate a rotational force and a gear unit 322 connected to the rotational driving unit 321 to be rotated by receiving the rotational force and engaged with the connecting gear 310a of the ring unit 310.

Accordingly, the ring unit 310 is formed in an annular shape and has connecting gears 310a repeatedly provided in the extension direction thereof. The ring unit 310 is provided in the driving space S1 of the cap unit 100.

The power transmission unit 320 may include a rotational driving unit 321 and a gear unit 322, the rotational driving unit 321 may be provided on the external surface of the cap unit 100, and the gear unit 322 may be located on the internal surface of the cap unit 100 so that the interference between components may be minimized. Since the gear unit 322 is engaged with the ring unit 310, when the rotational driving unit 321 operates, the ring unit 310 is rotated together the gear unit 322. As for the engagement method between the gear unit 322 and the ring unit 310, a gear connection method may be determined according to a design of, a worm gear, a bevel gear, a helical gear, a spur gear, or the like.

For the present reason, the in-wheel driving unit 200 is rotated together with the ring unit 310 so that the traveling direction determined according to the operation of the in-wheel driving unit 200 is changed.

Meanwhile, a guide unit 120 on which the ring unit 310 is accommodated is provided on the internal surface of the cap unit 100. Here, the guide unit 120 may be configured in a form of a groove recessed from the internal surface of the cap unit 100 and the ring unit 310 may be inserted into the guide unit 120, or the guide unit 120 may protrude from the internal surface of the cap unit 100 such that the ring unit 310 is accommodated on the upper end portion thereof. FIG. 5 illustrates an exemplary embodiment in which the guide unit 120 protrudes to the lower side of the ring unit 310 and the ring unit 310 is accommodated on the upper end portion of the guide unit 120. Furthermore, to ensure that the ring unit 310 rotates smoothly on the guide unit 120, a bearing structure or a friction reduction structure may be applied.

Through this, the position of the ring unit 310 may be fixed in the driving space S1 of the cap unit 100 by the guide unit 120, and a stable rotation operation may be performed.

Meanwhile, an inverter and power module controller 600 in which a power module configured to control driving and regenerative braking of the in-wheel driving unit 200 is embedded may be provided in the cap unit 100. Since the inverter and power module controller 600 is provided in the cap unit 100, it is possible to protect the inverter and power module controller 600 from impact, and it is easy to electrically connect the inverter and power module controller 600 to the in-wheel driving unit 200.

For the present reason, the inverter and power module controller 600 is responsible for driving of the in-wheel drive unit 200, and is easily applicable to various mobilities since each inverter and power module controller is interlocked with control of respective different mobilities when applied to various mobilities.

Meanwhile, the present invention is applicable to a multi-wheel drive mobility.

That is, the multi-wheel drive mobility according to various exemplary embodiments of the present invention includes: rotating wheel apparatuses 1000, each including a cap unit 100 defining a space at a lower side thereof, an in-wheel driving unit 200 provided in the space in the cap portion 100 to generate a driving force during operation, and an angle adjustment unit 300 connecting the in-wheel driving unit 200 to the cap unit 100 such that the in-wheel driving unit 200 is rotated in the circumferential direction of the cap unit 100 to cause the traveling direction determined according to the operation of the in-wheel driving portion 200 to be changed by 360 degrees around the vertical axis; and a controller 2000 configured to control the in-wheel driving unit 200 and the angle adjustment unit 300 of each of the rotating wheel apparatuses 1000 according to a requested traveling speed and a requested traveling direction thereof.

As described above, the rotating wheel apparatus 1000 includes a cap unit 100, an in-wheel driving unit 200, and an angle adjustment unit 300.

That is, the cap unit 100 is formed in a semicircular shape such that the driving space S1 is formed at the lower side thereof, and the in-wheel driving unit 200 is provided in the driving space S1.

The in-wheel driving unit 200 generates a driving force during operation, and may include a motor unit that generates power and a wheel unit which is rotated by the power of the motor unit. The in-wheel driving unit 200 is variously known as an in-wheel motor generally, and a detailed description thereof will be omitted.

Meanwhile, the angle adjustment unit 300 is provided on the internal surface of the cap unit 100, and the in-wheel driving unit 200 is connected to the cap unit 100 via the angle adjustment unit 300. The angle adjustment unit 300 rotates the in-wheel driving unit 200 in the circumferential direction of the cap unit 100 so that the traveling direction determined according to the operation of the in-wheel driving unit 200 is changed by 360 degrees. That is, when the in-wheel driving unit 200 is rotated by 360 degrees about the perpendicular axis in the driving space S1 of the cap unit 100 by the angle adjustment unit 300, the direction of the driving force generated by the operation of the in-wheel driving unit 200 is changed by 360 degrees. As a result, when the 360-degree rotating wheel apparatus 1000 according to various exemplary embodiments of the present invention is applied to a mobility, the movement radius of the mobility may be increased.

The rotating wheel apparatus 1000 including the cap portion 100, the in-wheel driving unit 200, and the angle adjustment unit 300 is provided on each of the front and the rear wheels. Thus, the mobility is capable of being driven by four wheels. of course, the mobility may be configured to be driven by a plurality of wheels other than four wheels depending on the number of components of the rotating wheel apparatus 1000.

In the following, to help the understanding of the present invention, it is assumed that the mobility is driven by four wheels.

Each rotating wheel apparatus 1000 is controlled by a controller 2000. That is, the controller 2000 controls the in-wheel driving unit 200 and the angle adjustment unit 300 of each rotating wheel apparatus 1000 according to a driver's control or the requested traveling speed and the requested traveling direction according to the movement to a set destination.

As an example, as illustrated in FIG. 7, when the requested traveling direction corresponds to straight forward traveling, the controller 2000 controls each angle adjustment unit 300 to be arranged such that the in-wheel driving units 200 of the rotating wheel apparatuses 1000 corresponding to the front and rear wheels are directed forward thereof. Furthermore, the controller 2000 controls the in-wheel driving units 200 corresponding to the front and rear wheels to be driven in the same direction thereof, so that the mobility is able to travel straight forwards by the respective rotating wheel apparatuses 1000 of the front and rear wheels.

Meanwhile, as illustrated in FIG. 8, when the requested traveling direction corresponds to turning traveling, the controller 2000 controls each angle adjustment unit 300 to be disposed such that the in-wheel driving units 200 of the rotating wheel apparatuses 1000 corresponding to the front wheels are directed toward the turning direction and the in-wheel driving units 200 of the rotating wheel apparatuses 1000 corresponding to the rear wheels are directed toward the direction opposite to the turning direction thereof. Furthermore, the controller 2000 controls the in-wheel driving units 200 corresponding to the front and rear wheels to be driven in the same direction thereof, so that the mobility is able to perform turning-traveling by the respective rotating wheel apparatuses 1000 of the front and rear wheels.

Furthermore, as illustrated in FIG. 9, when the requested traveling direction corresponds to lateral traveling of the multi-wheel drive mobility, the controller 2000 controls each angle adjustment unit 300 to be arranged such that the in-wheel driving units 200 of the rotating wheel apparatuses 1000 corresponding to the front and rear wheels are directed towards a lateral side of the multi-wheel drive mobility, and controls the in-wheel driving units 200 corresponding to the front and rear wheels to be driven in the same direction thereof. That is, it is possible for the mobility to travel to the lateral side by arranging respective in-wheel driving units 200 to be directed toward the same side using the angle adjustment units 300 of respective rotating wheel apparatuses 1000 and causing the in-wheel driving units 200 corresponding to the front and rear wheels to be driven in the same direction thereof.

Furthermore, as illustrated in FIG. 10, when the requested traveling direction corresponds to in-situ rotation, the controller 2000 controls respective angle adjustment units 300 such that the front left and rear right rotating wheel apparatuses 1000*a* and 1000*b* are rotated clockwise and the front right and rear left rotating wheel apparatuses 1000*c* and 1000*d* are rotated counterclockwise to cause each rotating wheel apparatus 1000 to be disposed diagonally, and such that the left in-wheel driving units are driven in a forward direction and the right in-wheel driving units 200 are driven in a reverse direction thereof.

That is, by the angle adjustment units 300 of respective rotating wheel apparatus 1000, the front left and rear right rotating wheel apparatuses 1000*a* and 1000*b* and rear right are rotated clockwise and the front right and rear left rotating wheel apparatuses 1000*c* and 1000*d* are rotated counterclockwise. As a result, the rotating wheel apparatuses 1000 are arranged diagonally such that each rotating wheel apparatus 1000 of the mobility is arranged to draw a circle around the vertical axis. Furthermore, the left in-wheel driving units 200 are driven in the forward direction thereof, and the right in-wheel driving units 200 are driven in the reverse direction thereof, whereby the mobility may be rotated 360 degrees clockwise. Here, when the left in-wheel driving units 200 and the right in-wheel driving units 200 are driven in opposite directions, the mobility may be rotated 360 degrees counterclockwise.

In a 360-degree rotating wheel apparatus 1000 configured as described above and a multi-wheel drive mobility using the same, wheels are rotated 360 degrees, increasing the traveling range of the mobility. Furthermore, the wheel apparatus is easily applicable to a mobility, so that the usability thereof is improved.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A 360-degree rotating wheel apparatus comprising:
a cap unit defining a driving space at a lower side of the cap unit;
an in-wheel driving unit provided in the driving space in the cap unit and configured to generate a driving force during operation thereof; and
an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis of the 360-degree rotating wheel apparatus,
wherein the angle adjustment unit includes:
a ring unit provided in the driving space in the cap unit and extending in a shape of a ring along a circumference of the cap unit, wherein a driveshaft extending from the in-wheel driving unit is connected to the ring unit; and
a power transmission unit provided in the cap unit and connected to the ring unit to rotate the ring unit depending on whether the power transmission unit operates.

2. The 360-degree rotating wheel apparatus of claim 1, further including:
a housing having an accommodation space to accommodate the cap unit therein,
wherein the housing and the cap unit are connected to each other via at least a suspension.

3. The 360-degree rotating wheel apparatus of claim 2, wherein the at least a suspension includes:
a first suspension provided at a center portion of the cap unit and connected to the housing, wherein the first suspension is configured to damp vibration caused according to a vertical movement of the 360-degree rotating wheel apparatus; and
a second suspension spaced from the first suspension and connected to the cap unit and the housing, wherein the second suspension is configured to damp vibration caused according to a longitudinal movement and a lateral movement of the 360-degree rotating wheel apparatus.

4. The 360-degree rotating wheel apparatus of claim 2, wherein a mounting portion is provided on a vehicle body for electrical connection and fixing, and
wherein the 360-degree rotating wheel apparatus further includes a fastening portion which is provided on an external surface of the housing to be fastened to the mounting portion in the vehicle body so that when the fastening portion is fastened to the mounting portion, the housing is fixed and electrically connected to the vehicle body.

5. The 360-degree rotating wheel apparatus of claim 1, wherein the ring unit has connecting gears provided in an extension direction of the ring unit, and
wherein the power transmission unit includes a rotational driving unit provided in the cap unit and configured to generate a rotational force and a gear unit connected to the rotational driving unit to be rotated by receiving the rotational force, wherein the gear unit is engaged with the connecting gears of the ring unit.

6. The 360-degree rotating wheel apparatus of claim 1, further including:
a guide unit on which the ring unit is accommodated, wherein the guide unit is provided on an internal surface of the cap unit.

7. A 360-degree rotating wheel apparatus comprising:
a cap unit defining a driving space at a lower side of the cap unit;
an in-wheel driving unit provided in the driving space in the cap unit and configured to generate a driving force during operation thereof;
an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis of the 360-degree rotating wheel apparatus; and
a bump rubber coupled to an external surface of the cap unit to cancel vibration transmitted through the in-wheel driving unit.

8. A 360-degree rotating wheel apparatus comprising:
a cap unit defining a driving space at a lower side of the cap unit;
an in-wheel driving unit provided in the driving space in the cap unit and configured to generate a driving force during operation thereof;
an angle adjustment unit coupling the in-wheel driving unit and the cap unit to each other and configured to cause the in-wheel driving unit to rotate in a circumferential direction of the cap unit so that a traveling direction of the 360-degree rotating wheel apparatus determined according to operation of the in-wheel driving unit is changed by 360 degrees around a vertical axis of the 360-degree rotating wheel apparatus; and an inverter and power module controller in which a power module configured to control driving and regenerative braking of the in-wheel driving unit is embedded, wherein the inverter and power module controller is provided in the cap unit.

* * * * *